Dec. 1, 1925.
A. C. ULRICH
1,564,154
MEASURING INSTRUMENT
Filed May 31, 1924
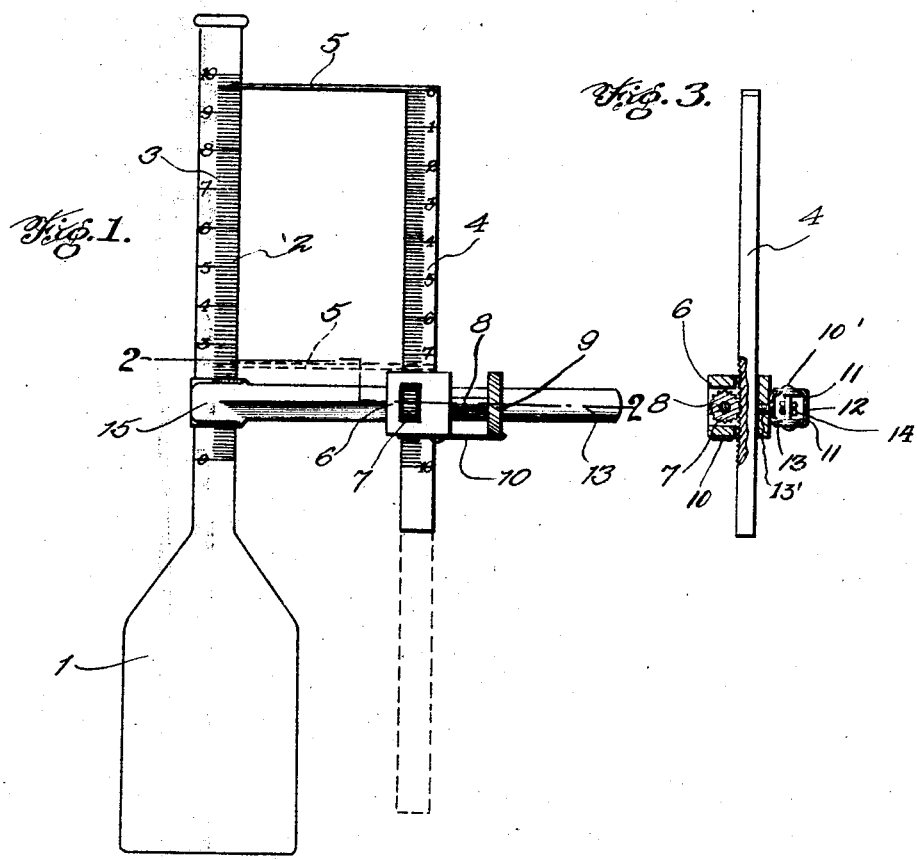
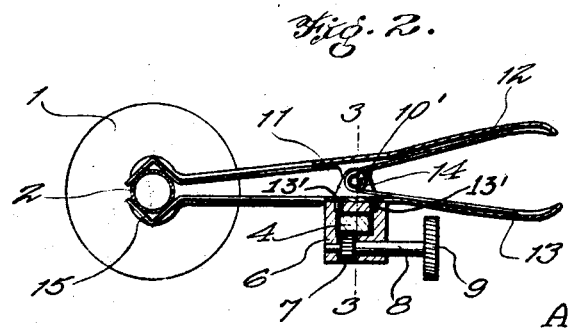
Alfred C. Ulrich
INVENTOR
BY Victor J. Evans
ATTORNEY
WITNESS:

Patented Dec. 1, 1925.

1,564,154

UNITED STATES PATENT OFFICE.

ALFRED C. ULRICH, OF HORICON, WISCONSIN.

MEASURING INSTRUMENT.

Application filed May 31, 1924. Serial No. 717,103.

*To all whom it may concern:*

Be it known that I, ALFRED C. ULRICH, a citizen of the United States, residing at Horicon, in the county of Dodge and State of Wisconsin, have invented new and useful Improvements in Measuring Instruments, of which the following is a specification.

In the test reading for ascertaining the butter fat in milk or cream, the test bottle is held in one hand, and the meniscus of the fat column in the neck of the test bottle is measured by a pair of dividers. Accurate results are seldom thus obtained for the reason that the measurement is rendered defective by the slightest degree of nervousness on the part of the tester.

It is therefore the object of this invention to provide a means for testing milk in which the employment of calipers is entirely dispensed with and which may be operated to positively obtain the degree or distance between the top and bottom meniscus caused by the butter fat in the neck of a milk testing bottle.

With the above broadly stated object in view and others which will appear as the nature of the invention is better understood, reference is to be had to the drawing which accompanies and which forms part of this application.

In the drawing:—

Figure 1 is an elevation illustrating my improvement in applied position.

Figure 2 is a sectional view on the line 2—2 of Figure 1.

Figure 3 is a sectional view on the line 3—3 of Figure 2.

In the drawing the numeral 1 designates a milk testing bottle which has its neck 2 graduated, as at 3, in the usual manner and for the usual purpose.

My improvement contemplates the employment of a scale 4, similar to the scale 3 on the neck 2 of the bottle tester. The scale 4 has at its upper end an angularly disposed finger in the nature of a thin metal plate 5. The scale is movable through an opening in a block 6, the latter, as well as the scale being preferably constructed of aluminum. The scale, in a line with its degree marks is formed with depressions and teeth between said depressions. These teeth are engaged by a toothed wheel 7 that has its shaft 8 journaled in suitable bearings in the sides of the block 6, the wheel being received in a suitable pocket in the block. The shaft 8 is of two dimensions, the smaller of which receiving thereon the milled wheel 7, one face of the said wheel contacting with the end of the other portion of the shaft. The larger portion is extended a suitable distance beyond one side of the block and is provided with a milled head 9. The bottom of the block has fixed thereon one end of a flat spring 10. The second end of this contacts with the milled head 9 to hold the latter from accidental turning, and consequently preventing the accidental movement of the slide 4 through the block 6.

The numerals 12 and 13 designate oppositely disposed arms. The arms have inwardly directed lapping ears 11 through which passes a pivot 10', that, of course, connects the arms. The arm 12, between its ears 11, is secured to the block 6 by means, such as screws 13'.

Surrounding the pivot 10' there is the central coiled portion 14 of a spring. The arms of the spring 14 are in contacting engagement with the inner faces of the outer portions of the arms 12 and 13 and, of course, influence these ends of the arms away from each other. The portions of the arms engaged by the spring in reality provide the handles for jaw members 15 formed on the opposite ends of the said arms. These jaw members are designed for frictional engagement with the neck 2 of the test bottle 1. By providing the spring handle operated clamps as above described the block may be positioned in a line with the top meniscus of the milk in the neck 3 of the test bottle, and the milled head 9 of the shaft 8 may be operated to move the scale 4 to bring its finger 5 opposite and in a direct line with the top meniscus of the cream in the neck of the test bottle, and by this means the amount of butter fat in the milk may be accurately ascertained. The improvement may, of course, also be employed in testing cream, and it is thought that the foregoing description, when taken in connection with the drawing will fully set forth the construction and advantages of my improvement to those skilled in the art to which such inventions relate.

Having described the invention, I claim:—

1. A means for ascertaining the butter fat in milk or cream in which a test bottle having a graduated neck is employed, said means comprising a scale graduated to correspond with the graduations on the neck of the test bottle, a finger on the upper end of the scale and at right angles thereto, a block through which the scale passes, means mounted on the block for moving the scale through the block, means on said block for preventing the accidental movement of the scale through the block, and means for so clamping the block on the test bottle that the scale will be parallel to the neck thereof.

2. In a means for ascertaining the degree of butter fat in milk or cream in which a test bottle having a graduated neck is employed, said means comprising a scale having depressions spaced to correspond to the graduations on the neck of the test bottle, a right angular finger on the upper end of the scale, a toothed wheel journaled in the block with its teeth engaging the depressions on the scale, operating means for the wheel, means on said block frictionally engaging said operating means for preventing the free turning thereof, and means connected with the block for so clamping the block on the test bottle that the scale will be parallel to the neck thereof.

In testimony whereof I affix my signature.

ALFRED C. ULRICH.